United States Patent [19]

Torini

[11] Patent Number: 5,792,365

[45] Date of Patent: Aug. 11, 1998

[54] PURIFICATION PROCESS OF POLAR LIQUID WASTES CONTAINING SUSPENDED SOLVATED PARTICLES AND FLOCCULATING COMPOSITION THEREFOR

[75] Inventor: Alberto Torini, Milan, Italy

[73] Assignee: Italtraco S.r.l., Milan, Italy

[21] Appl. No.: 817,005

[22] PCT Filed: Oct. 3, 1995

[86] PCT No.: PCT/EP95/03904

§ 371 Date: Mar. 31, 1997

§ 102(e) Date: Mar. 31, 1997

[87] PCT Pub. No.: WO96/10540

PCT Pub. Date: Apr. 11, 1996

[30] Foreign Application Priority Data

Oct. 4, 1994 [IT] Italy ............... MI94A2018

[51] Int. Cl.$^6$ ........................... C02F 1/52

[52] U.S. Cl. ............... 210/714; 210/716; 210/724; 210/778; 252/175

[58] Field of Search ............ 210/660, 665, 210/667, 702, 714, 716, 726, 727, 724, 778; 252/175, 179, 181; 502/80, 85

[56] References Cited

U.S. PATENT DOCUMENTS

| 2,281,759 | 5/1942 | Gelder | 210/716 |
|---|---|---|---|
| 2,362,022 | 11/1944 | Olin | 210/716 |
| 3,128,249 | 4/1964 | Pye et al. | 210/727 |
| 3,130,167 | 4/1964 | Green | 210/728 |
| 3,511,778 | 5/1970 | Libor et al. | 210/716 |

FOREIGN PATENT DOCUMENTS

| 0 044 058 | 1/1982 | European Pat. Off. . |
| 0 379 997 | 8/1990 | European Pat. Off. . |
| 2 640 613 | 6/1990 | France . |
| 2 679 546 | 1/1993 | France . |

*Primary Examiner*—Peter A. Hruskoci
*Attorney, Agent, or Firm*—Young & Thompson

[57] ABSTRACT

A process to purify polar liquid wastes consists in treating the wastes with a flocculating composition formed by a concentrated suspension of montmorillonite into a polar liquid, and preferably into the same polar liquid waste to be treated. Selected pH and concentration ranges are determined in order to obtain short or very short contact times and a complete purification of the treated polar liquid wastes.

8 Claims, No Drawings

PURIFICATION PROCESS OF POLAR LIQUID WASTES CONTAINING SUSPENDED SOLVATED PARTICLES AND FLOCCULATING COMPOSITION THEREFOR

FIELD OF THE INVENTION

The present invention concerns a process to purify polar liquid wastes containing colloidal dispersions of solvated particles, and a flocculating composition used in said process. The liquid resulting from said process is totally purified from said solvated particles and can thus be reintroduced in the environment or recycled into an industrial process without undergoing further treatments.

BACKGROUND OF THE INVENTION

It is known that the main problem connected to the use of water for agricultural, civil and industrial purposes, lies in the huge consumption of water which, after having been used, cannot be re-employed due to the impurities contained therein, or otherwise creates several pollution problems when disposed of in the environment.

The present international and European Union guidelines on water consumption provide for drastic reductions in the water resources for agricultural, civil and industrial uses, imposing the partial or total recycling of the waste waters resulting from the primary working cycles in which the water is used.

Liquid colloidal dispersions are characterized by dispersions of solids, liquids or gases into a homogeneous liquid. Two stability factors enable the particles of the different substances to remain in suspension and separate so as to form a liquid colloidal dispersion: electric charge or salvation.

Electric charge causes the repulsion of the particles and is determined by the absorption of ions onto their surface.

Solvation is determined by the tendency of many substances to cause the molecules of the polar liquid in which they are suspended to strongly adhere thereon, forming a coating which prevents them from joining and thickening.

The treatment of liquid colloidal dispersions characterized by electrically charged particles involves no particular difficulties, in that the addition of electrolytes reduces the dispersion, causing the flocculation of the dispersed impurities.

The problem created by solvated particles is instead more difficult to solve, since salvation confers to the colloids a far higher stability than electric charge. Solvated particles are practically insensitive to the action of electrolytes and, furthermore, polar liquids allow stable suspensions to be formed also with relatively large particles (emulsions and/or suspensions of bentonites clays kaolin and the like).

There is hence an unsatisfied demand for a simple and economic process apt to efficiently separate solvated impurities from polar liquid wastes containing colloidal dispersions thereof, so as to allow the resulting clear liquid to be discharged into its natural environment with no pollution problems. Since many primary working processes make use of large quantities of fresh water, a process of this type would provide the considerable advantage of drastically reducing fresh water consumption; in fact, once the dispersed impurities have been removed, it would often be possible to recycle the water initially used in the primary process. Preferably, such impurities should be separated into a non-liquid form so as to be easily eliminated.

Such a process will obviously be the more advantageous, the higher the possibilities of its universal use, independently from the nature of the solvated impurities.

SUMMARY OF THE INVENTION

The Applicant has thus been involved in deep studies in order to seek a purification process allowing to obtain clear liquids from polar liquid wastes containing colloidal dispersions of solvated particles, to be carried out on the widest range of liquid wastes containing this type of colloidal dispersions, and to provide the highest reliability with the most disparate solvated substances. A further problem having to be faced in said process is to use therein only additives which are not apt to increase the salt and/or impurity contents in the waste waters being purified; moreover, such additives should preferably be food grade ones, as many waste waters result from food industries whereby, to recycle the purified waste waters in the primary working cycle, the additives used in the purification process need to be harmless.

At the end of his studies the Applicant has surprisingly discovered that montmorillonite —commercially known as a thickening agent, to be used in combination with flocculating agents in order to increase the weight and volume of already formed flocks and favor their precipitation, as disclosed for example in FR-A-2640613 / - has instead the capacity to give rise, itself to the forming of flocks with solvated particles. In selected conditions, said flocculation turns out to be exceptionally effective and fast.

On the basis of such a discovery the Applicant has conceived the present invention, which allows to solve all the problems cited heretofore by providing a process to purify polar liquid wastes containing colloidal dispersions of solvated particles, characterised in that it comprises:

a first step, wherein a flocculating composition is prepared by:

dispersing montmorillonite in a polar liquid to form an homogeneous suspension;

keeping or conditioning the pH of said suspension in a range between 5 and 9;

leaving said suspension to react, possibly under mild stirring, for a period of time sufficient to obtain the aggregation to the montmorillonite of most of the solvated particles of said polar liquid and, in any case, of at least one hour; and a second step, wherein a complete liquid/solid separation is obtained by:

adding said flocculating composition, free of any additional flocculating agent, to said polar liquid wastes and thoroughly mixing the same, up to obtaining a mixture having a final montmorillonite concentration of not less than 20 ppm;

keeping or conditioning the pH of the mixture, thus obtained, in a range above 2.5;

stirring the mixture for a predetermined period of contact time; and filtering the mixture.

The invention also concerns the flocculating composition used in said process, comprising an homogeneous montmorillonite suspension in a polar liquid having a pH in a range between 5 and 9, free of any additional flocculating agent and aged for a predetermined period of time sufficient to obtain the aggregation to the montmorillonite of most of the solvated particles of said polar liquid and, in any case, of at least one hour.

DETAILED DESCRIPTION OF THE INVENTION

The present invention will be understood more clearly from the following description, accompanied by some Examples given by mere way of explanation and not to be considered as limiting its scope.

The purification process of the present invention comprises a first step, which consists in preparing a flocculating composition to be added to the polar liquid waste to be treated. The composition is prepared by suspending the montmorillonite, in a concentration between 0.5% and 15% by weight, into a polar liquid; said suspension will have —or %will be conditioned so as to obtain —a pH between 5 and 9. This polar liquid is preferably a fraction of the polar liquid waste having to be treated, or a polar liquid containing a colloidal dispersion having the same solvated substances present in the liquid waste. To achieve the best results in terms of flocculation speed, the suspension thus obtained is left to react for at least one hour possibly under mild stirring, hence obtaining the preferred flocculating composition wherein the montmorillonite has been "selectively activated" to a full extent.

It is important to note that, both in the case of the montmorillonite having been suspended into a fresh polar liquid, and in the case it has instead been preferably suspended into a fraction of the polar liquid waste to be treated or into a polar liquid containing the same solvated substances, no flocculation nor precipitation takes place either of the montmorillonite or of the solvated substances, so that the flocculating composition can be preserved, without getting altered, even for long periods of time. To obtain this result, the montmorillonite has to be added in a high excess in respect of the solvated particles, whereby there is no possible formation of flocks having a sufficiently large size to settle. It is thus evident that the montmorillonite concentration values within the above indicated range will be higher, the greater the content of solvated particles in the polar liquid.

Montmorillonite is a clayish mineral characterized by an expanding reticular structure; it comprises a group of minerals (beidellite, non-tronite, hectorite and saponite) having, to a different extent, the same characteristic. The theoretical formula of montmorillonite with no structural substitutions is $(OH)_4Si_8Al_4O_{20} \cdot nH_2O$.

Montmorillonite is a mineral with three layers; it is in fact formed by packed layers comprising two layers of tetrahedrons $SiO_4$ —with the Si atom at the centre —and one intermediate layer of octahedrons —with an Al atom at the centre —.

The silica-alumina-silica units are continuous in the crystallographic directions "a" and "b", and they are superposed in the direction "c"; with this arrangement the oxygen levels of the neighbouring units get to be adjacent; this determines the existence of a weak bond and of a foliation between the units.

The length of the axis "c", between the layers, can vary considerably: from 9.5Å to 21.4Å. Normally, the extension of the axis "c" takes place by absorption —between the single layers of the mineral —of water or of other polar molecules, favoured by the very weak bonding forces characteristic of montmorillonite.

In practice, said mineral always has a different composition from the theoretical one. In the tetrahedrons layer, silica can often be substituted by aluminum and by phosphorous, while the aluminum at the centre of the octahedrons of the intermediate layer can be substituted by Mg, Fe, Li.

Once the above flocculating composition is ready for use, having completed the "selective activation" of montmorillonite, the process of the present invention continues with a second step in which said composition is added, under stirring, to the polar liquid waste to be treated, which will have —or will be conditioned so as to obtain —a pH higher than 2.5, up to reaching a final montmorillonite concentration of not less than 20 ppm, and preferably at least 20 ppm higher than the stoichiometric concentration apt to flocculate all the solvated particles; by continuing to stir only for a few minutes, one obtains the quick precipitation of the solvated substances agglomerated to the montmorillonite. By filtration —for example —it is then possible to rapidly separate a clear homogeneous liquid from a residue, consisting of the solvated impurities which have agglomerated to the montmorillonite.

A possible explanation for this phenomenon —to which, however, the present invention should not be limited —is given hereinafter.

When dry montmorillonite, in relatively high concentrations, is dispersed into a polar liquid waste containing a liquid colloidal dispersion of solvated particles, part of the residual charge of the montmorillonite particles is neutralized, for instance by water (through the hydrogen bond); in this way, also the solvated particles (surrounded by water) are attracted by the montmorillonite particles, which will extend its crystallographic axis "c" up to allowing the inlet into the mineral of the solvated particles (impurities), which will confer lyophilic characteristics to the montmorillonite.

Once completed the preparing of the flocculating composition, i.e. the aggregation of most of the solvated particles to the montmorillonite, one obtains the so-called montmorillonite "activated selectively"; when the same is added, under stirring, to the polar liquid waste containing the same solvated particles which have allowed the selective extension of the axis "c", these last ones are: in part —as in the first step of the process —attracted by the residual charge of the particles of the montmorillonite "activated selectively", thereby penetrating into the same and increasing the lyophility of the montmorillonite surface; and in part caused, by constant stirring, to collide with the lyophilic montmorillonite particles, hence allowing the lyophilic substances, contained in the solvated particles, to diffuse into the lyophilic layer which covers more and more abundantly the montmorillonite surface. This phenomenon determines the complete aggregation of the lyophilic impurities contained in the solvated colloids present in the polar liquid waste, in flocks of high volume and weight, thereby allowing an easy and quick precipitation thereof. By filtration, for example, it is then possible to rapidly separate a clear homogeneous liquid from a residue formed by the montmorillonite and aggregated impurities.

The process object of the present invention is therefore, in its whole, quite simple and rapid. It in fact only requires the addition of a predetermined quantity of the flocculating composition (proportional to the concentration of the solvated substances) under strong stirring; the precipitation of the agglomerates formed by the montmorillonite and the impurities takes place in a very short period of time —in the range between few seconds and some minutes —and the separation of the clear liquid is quickly obtained, for instance by filtration.

The process of the present invention is also characterized by the fact that the treated liquid is by no means altered chemically, in that the montmorillonite is totally insoluble and is thus fully eliminated by filtration and/or other known techniques of liquid/solid separation; this characteristic allows to re-employ the clear liquids, obtained with the process of the invention, in the primary cycle from which the liquid wastes have flown out.

The present invention can be efficiently applied to all the polar liquid wastes containing solvated particles, independently from the chemical nature of the particles, seen that the purification process involved is essentially of the physical type.

By way of example, one may treat successfully polar liquid wastes forming the effluents of industrial car washers and the like, of sewers, of animal breeding, and of industry in general. Using a food grade montmorillonite, the process of the invention can be successfully applied also to the effluents of the food industry. A further very interesting application consists in treating bilge waters, in view to obtain a perfectly clear liquid.

As well as in the full treatment of civil and industrial effluents, the process of the present invention has also proved particularly useful in the primary treatment of those effluents which must undergo reverse osmosis, ultrafiltration or electrodialysis processes, as it allows to increase the performances and to prolong the life of the relevant membranes.

The montmorillonite "activated selectively" can be validly used in all the aforecited application fields, with the greatest efficiency and effectiveness. One of the minerals which has shown the best results is characterized by the following main physical parameters:
Moisture: 10% max
Limit of liquid state: 450–500%
Swelling: 30–35 ml/2 g
Granulometry: 90% below 75 micron.

when the clear liquid resulting from the process of the invention still shows traces of oils —either suspended or emulsified —these can be totally eliminated by adopting the oil-separation system, and respective apparatus, described in the patent application PCT/EP93/01053 filed by the same Applicant. It is just in order to obtain the best results from said system that the Applicant has conceived the process and the composition according to the present invention.

EXAMPLES

Although the invention finds a suitable application in the purification of polar liquid wastes containing solvated particles, wherever they come from, and in the clarification of bilge waters, reference will be made in the following Examples —to simplify the description —only to the effluents from industrial car washers, and to bilge waters (after gravimetric removal of the free oils), without however wishing to limit to these fields the scope of the present invention.

EXAMPLE 1—Purification of Car-Wash Waste Waters

A preferred flocculating composition of the invention used for treating car-wash waste water, so as to be able to use it again in the successive washing cycle, consisted in a 10% montmorillonite suspension into a fraction of the polar liquid waste having to be treated, prepared at room temperature and conditioned —if necessary —so as to have a pH of about 6.5; the montmorillonite was left to "activate selectively" for three hours, under mild stirring. The suspension was prepared by slowly adding the montmorillonite to the liquid waste —kept under strong stirring —and by continuing to stir until the mineral crumbs had totally disappeared.

According to the process of the invention, 100 g of said composition were added, under stirring, to a sample of 50 litres of effluent from a highly utilized car-wash plant—having the following characteristics:

pH: 6.8
Suspended solids: 118 mg/l
COD: 222 mg/l
Surfactants (MBAS): 5.25 mg/l
Total oils: 18.3 mg/l
so as to reach a final concentration of montmorillonite "activated selectively" equal to 200 ppm. The suspension thus obtained was mixed for another five minutes and left to react for five minutes.

A sample of five litres of the mixture thus obtained was filtered with a fast filtering paper filter; the filtrate, perfectly clear, showed the following characteristics:
Suspended solids: absent
COD: 85 mg/l
Surfactants (MBAS): 1.50 mg/l
Total oils: traces On examining the results reported in the previous Example 1, it can be noted that the purification process of car-wash waste waters gives a water which—besides abundantly falling within the limits imposed by Table A of the Italian law No. 319/76—allows to be advantageously used again in successive washing cycles.

Further subsequent tests on the washing plant have confirmed the rapidity of the process of the invention and the fitness of the water resulting therefrom to be used again in the successive washing cycles.

EXAMPLE 2—Clarification of Bilge Waters

A sample of 10 litres of bilge waters, which contained—inter alia—a colloidal dispersion formed by solvated particles, as subjected to gravimetric separation of the free oil, which stratified on the upper part of the separator and was recovered. A sample of 20 ml of the remaining waste waters—rather turbid and having a pH of 6.4—was mixed to 75 ml of fresh water to reduce the high concentration of electrolytes, typical of sea-water; 5 g of dry montmorillonite were added to said solution, slowly and under strong stirring. The montmorillonite was then left to "activate selectively" for three hours, stirring the suspension every now and then, to produce a flocculating composition.

To 5 litres of the gravimetrically oil-freed waste water, there were added, under stirring, 50 ml of the above composition, so as to reach a final concentration of montmorillonite "activated selectively" equal to 500 ppm. Stirring was continued for five minutes and the mixture was left to react for another five minutes. After filtration—with a fast-filtering paper filter—a perfectly clear filtrate was obtained, the surface of which showed traces of free oils which were fully separated through the system described in the Patent Application PCT/EP93/01053 cited heretofore.

EXAMPLES 3 AND 4

Examples 1 and 2 were repeated in a continuous working process, using mechanical mixers into which flowed and min-led a main flow formed by the polar liquid waste to be treated, and a secondary flow formed by the flocculating composition according to the invention, in the wanted flow rates. At the end of the filtering operations, the filtrates obtained had the same characteristics as those obtained in Examples 1 and 2, while the times of contact before filtration were reduced within a range between 2 and 20 seconds.

The present invention has been described with reference to some specific examples of application, but it is evident that its protection scope should be extended in a fully general way to the use of montmorillonite as a flocculating agent for colloidal dispersions of solvated particles, as defined in the following claims.

I claim:

1. Process for purifying a polar liquid waste containing colloidal dispersions of solvated particles, which comprises:
   a first step of preparing a flocculating composition by:
      dispersing montmorillonite in a polar liquid containing solvated particles to form an homogeneous suspension;
      keeping or conditioning the pH of said suspension in a range between 5 and 9;
   leaving said suspension to react under mild stirring for at least one hour to obtain the aggregation to the montmorillonite of most of the solvated particles of said polar liquid, without the formation of flocks having a sufficient size to settle; and
   a second step of obtaining a complete liquid/solid separation by:
      adding said flocculating composition, free of any additional flocculating agent, to said polar liquid waste and thoroughly mixing the same to obtain a mixture having a final montmorillonite concentration of not less than 20 ppm;
      keeping or conditioning the pH of the mixture, thus obtained to a level above 2.5;
      stirring the mixture for a predetermined period of contact time to form flocks of said montmorillonite and said solvated particles, free of any additional flocculating agent; and
      filtering the mixture to separate a clear homogeneous liquid from said flocks.

2. Process as recited in claim 1, wherein said flocculating composition has a final montmorillonite concentration in the range between 0.5 and 15% by weight.

3. Process as recited in claim 1, wherein said polar liquid is a fraction of the same polar liquid waste to be treated.

4. Process as recited in claim 1, wherein said polar liquid contains a colloidal dispersion having the same solvated substances present in the polar liquid waste.

5. Process as recited in claim 1, wherein the final concentration of montmorillonite in the polar liquid waste to be treated is at least 20 ppm higher than the concentration stoichiometrically required th flocculate all the solvated particles.

6. Process as recited in claim 1, wherein said contact time is between 2 seconds and 10 minutes.

7. Process as recited in claim 1, wherein the process is carried out as a batch process.

8. Process as recited in claim 1, wherein the process is a continuous process.

* * * * *